United States Patent
Ishii et al.

(10) Patent No.: US 6,450,908 B2
(45) Date of Patent: Sep. 17, 2002

(54) TENSIONER FOR APPLYING TENSION TO FORCE TRANSMITTING MEMBER

(75) Inventors: Kazuo Ishii, Kamiina-gun; Shigemasa Takahashi, Komagane; Tanehira Amano, Komagane; Takao Kobayashi, Komagane; Kenjiro Kawanabe, Ina, all of (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 09/867,188

(22) Filed: May 29, 2001

Related U.S. Application Data (63) Continuation of application No. PCT/JP99/06700, filed on Nov. 30, 1999.

(30) Foreign Application Priority Data

Nov. 30, 1998 (JP) ............................................. 10-339685
Nov. 18, 1999 (JP) ............................................. 11-328865

(51) Int. Cl.[7] ............................... F16H 7/12; F16H 7/22
(52) U.S. Cl. ......................... 474/138; 474/101; 474/133
(58) Field of Search .......................... 474/101, 109–111, 474/133, 138, 113–117, 135, 136, 140

(56) References Cited

U.S. PATENT DOCUMENTS

| | | | | |
|---|---|---|---|---|
| 4,371,360 A | * | 2/1983 | Ojima et al. | 474/111 |
| 4,411,638 A | * | 10/1983 | Wilson | 474/138 |
| 4,863,417 A | * | 9/1989 | Kimata et al. | 474/101 |
| 4,938,735 A | * | 7/1990 | Mitchell et al. | 474/101 |
| 4,940,448 A | | 7/1990 | Kober et al. | |
| 5,391,118 A | * | 2/1995 | Tsai et al. | 474/138 |
| 5,961,410 A | * | 10/1999 | Yamamoto | 474/110 |

FOREIGN PATENT DOCUMENTS

| | | |
|---|---|---|
| JP | 61-248950 | 11/1986 |
| JP | 07-004483 | 1/1995 |
| JP | 8-86206 | 4/1996 |
| JP | 9-282739 | 10/1997 |

* cited by examiner

Primary Examiner—David A. Bucci
Assistant Examiner—Marcus Charles
(74) Attorney, Agent, or Firm—Frishauf, Holtz, Goodman & Chick, P.C.

(57) ABSTRACT

A tensioner comprises shaft members that mate with each other by way of thread portions. A first shaft member is rotatable with respect to a casing and is restrained from moving in its axial direction. A second shaft member, which is restrained from rotating with respect to the casing, is movable in its axial direction. A torsion spring applies torque in a first direction to the first shaft member. A torque switching member, which can switch frictional torque in association with the rotation of the first shaft member, is provided between the first shaft member and the casing.

12 Claims, 10 Drawing Sheets

TENSIONER FOR APPLYING TENSION TO FORCE TRANSMITTING MEMBER

CROSS-REFERENCE TO RELATED APPLICATIONS

This is a Continuation Application of PCT Application No. PCT/JP99/06700, filed Nov. 30, 1999, which was not published under PCT Article 21(2) in English.

This application is based upon and claims the benefit of priority from the prior Japanese Patent Applications No. 10-339685, filed Nov. 30, 1998; and No. 11-328865, filed Nov. 18, 1999, the entire contents of both of which are incorporated herein by reference.

BACKGROUND OF THE INVENTION

The present invention relates to a tensioner for appropriately maintaining the tension of a force transmitting member, such as an endless belt or endless chain, in a power transmission mechanism that uses the force transmitting member.

Figure 21:
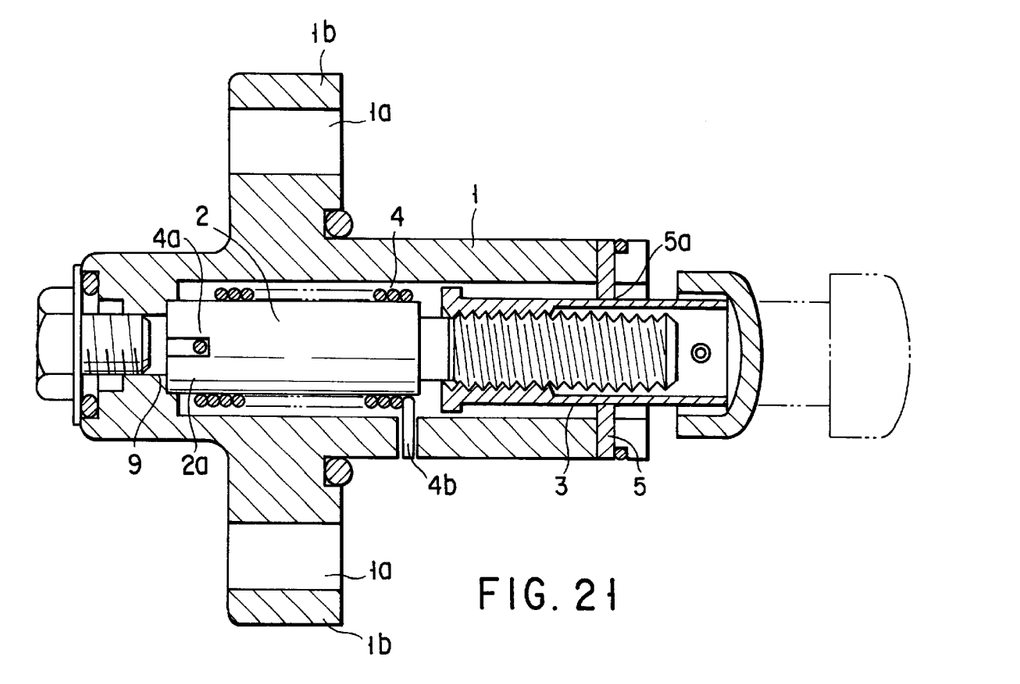
FIG. 21 is a sectional view of a conventional tensioner.
Figure 22:
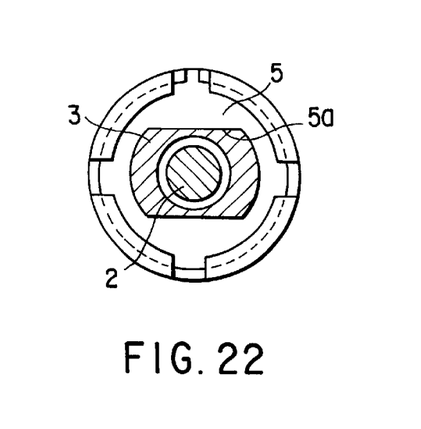
FIG. 22 is a sectional view of the tensioner shown in FIG. 21 taken in the diametrical direction.

A force transmitting member, such as an endless belt or chain, is used in a power transmission mechanism that transmits rotary motion to cam shaft in an engine of an automobile, for example. In some cases, a tensioner is used to keep the tension of the force transmitting member appropriate. FIGS. 21 and 22 individually show sections of a conventional tensioner. This tensioner is provided with a casing 1. A first shaft member 2 and a tubular second shaft member 3 are inserted in the casing 1. The casing 1 is provided with a flange portion 1b that has a mounting hole 1a for fixation on an apparatus such as an engine. An external thread portion is formed on the outer surface of the first shaft member 2. An internal thread portion is formed on the inner surface of the second shaft member 3. These external and internal thread portions mate with each other. A rear end portion 2a of the first shaft member 2 is inserted in a fitting hole 9 that is formed inside the casing 1. The end face of the rear end portion 2a is in contact with the inner surface of the casing 1. A torsion spring 4 is provided around the first shaft member 2. One end 4a of the torsion spring 4 is anchored to the first shaft member 2, while the other end 4b is anchored to the casing 1. If the spring 4 is twisted, the repulsive force of the spring 4 generates torque that causes the first shaft member 2 to rotate. The first shaft member 2 is rotatable with respect to the casing 1.

The cylindrical second shaft member 3 penetrates a sliding hole 5a that is formed in a bearing 5. As shown in FIG. 22, both the outer peripheral surface of the second shaft member 3 and the inner peripheral surface of the sliding hole 5a are noncircular. Thus, the second shaft member 3 is allowed to move in its axial direction with respect to the bearing 5, and is prevented from rotating. If the first shaft member 2 is rotated by means of the repulsive force of the torsion spring 4, therefore, the second shaft member 3 generates an axial thrust without rotating. For example, the repulsive force of the spring 4 acts in a direction such that it causes the second shaft member 3 to project from the casing 1. A moderate tension can be applied to the aforesaid force transmitting member, the belt or chain, by applying this thrust to the force transmitting member. If the second shaft member 3 pushes the force transmitting member, a reactive force from the force transmitting member acts on the shaft member 3. The shaft member 3 moves in its axial direction to a position such that this reaction force (input load) balances with the thrust of the shaft member 3 that is generated by means of the torsion spring 4. Thus, the conventional tensioner has a linear characteristic such that the input load is proportional to the movement of the second shaft member 3.

The tension of the force transmitting member, the chain or belt, continuously changes depending on the operating conditions of the engine, for example. Since the conventional tensioner has linear characteristics, however, it cannot easily cope with a wide variation in input load.

The following is a description of the relation between the force (thrust) of the tensioner which pushes the force transmitting member and a displacement amplitude σ of the tensioner. The stiffness of the tensioner can be represented by the movement (i.e., displacement amplitude σ) of the second shaft member relative to the load received from the force transmitting member. Although a tensioner with great thrust and high stiffness can resist a heavy input load, its displacement amplitude a is small. If the thrust of the tensioner is made smaller, in contrast with this, a heavy input load cannot be coped with, although the displacement amplitude σ can be made greater. The displacement amplitude σ becomes smaller if the stiffness of the tensioner for a large engine displacement is enhanced. Thus, a high-stiffness tensioner must inevitably be designed to function within a narrow range of displacement amplitude σ, that is, the degree of freedom of the tensioner design is low.

The object of the present invention is to provide a tensioner capable of coping with a large variation of amplitude despite its high stiffness, thereby dealing with a wide range of input loads.

BRIEF SUMMARY OF THE INVENTION

A tensioner of the present invention comprises: a first shaft member rotatably inserted in a casing so as to be restrained from axial movement and having a first thread portion; a second shaft member having a second thread portion mating with the first thread portion, axially movable with respect to the casing, and restrained from rotation; a torsion spring for generating torque capable of rotating the first shaft member; and torque switching means for changing the turning torque of the first shaft member in accordance with the rotational angle of the first shaft member.

The torque switching means can use a torque switching member that is adapted to generate a small frictional torque when the rotational angle of the first shaft member is narrow and to generate a large frictional torque when the rotational angle is wide.

In the tensioner of this invention, the load applied to the second shaft from a force transmitting member such as a belt or chain causes the first thread portion and the second thread portion to rotate the first shaft member. As long as the rotational angle after the start of rotation of the first shaft member is narrow, the torque switching member generates a small turning torque. If the rotational angle of the first shaft member becomes wider, the torque switching member generates a strong turning torque. Thus, a heavy received load can be coped with, and a small amplitude displacement can be followed satisfactorily. The force transmitting member that is used in a large-displacement engine or the like, for example, can cope with wide variations in the received load, and an appropriate tension can be applied to the force transmitting member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to FIGS. 1 to 5A. In the description of the embodiments to follow, like numerals are used to designate common components.

Figure 1:
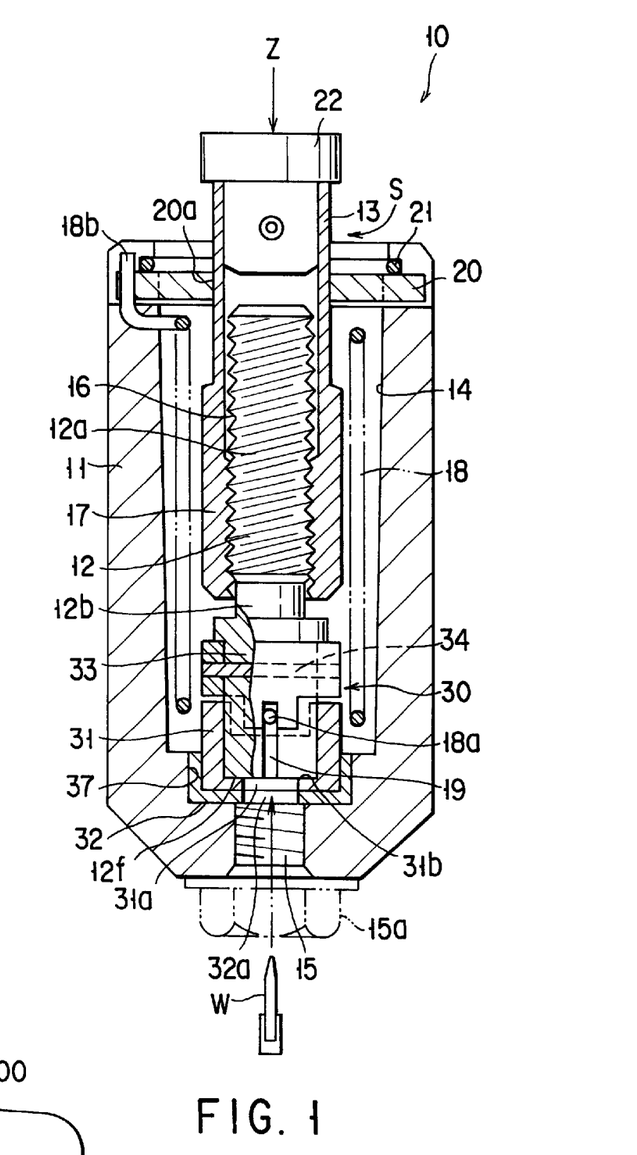
FIG. 1 is a sectional view of a tensioner according to a first embodiment of the present invention.
Figure 2:
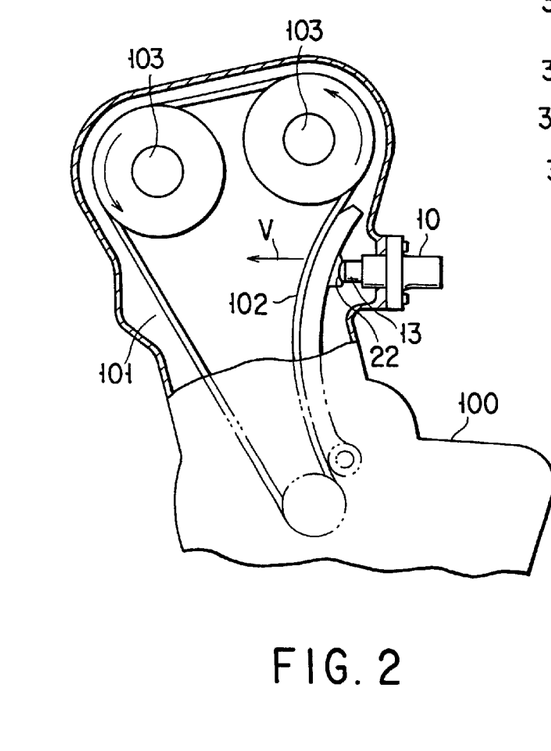
FIG. 2 is a sectional view of a part of an engine showing an example of use of the tensioner shown in FIG. 1.

A tensioner 10 shown in FIG. 1 is used in a power transmission mechanism 101 of an automotive engine 100 shown in FIG. 2, for example. The power transmission mechanism 101 transmits rotary motion of the engine 100 to a camshaft 103 by means of an endless force transmitting member 102 such as a timing belt or chain. The tensioner 10, which is mounted in a given position on the engine 100, generates thrust mentioned later, thereby pushing the force transmitting member 102 in the direction indicated by arrow V.

The tensioner 10 comprises a hollow casing 11, a first shaft member 12, and a second shaft member 13. Thread portions 16 and 17 of these shaft members 12 and 13 engage each other in a threaded manner, thereby forming a shaft assembly S. The shaft assembly S is inserted in the casing 11. The casing 11 is formed having a cavity portion 14 that extends in the axial direction of the casing 11 and in which the shaft assembly S is to be inserted. The front end portion of the casing 11 has an opening, through which the second shaft member 13 advances and retreats. A tapped hole 15 is formed in the rear end portion of the casing 11. A bolt 15a for sealing the interior of the casing 11 is screwed into the tapped hole 15.

The external thread portion 16 is formed on the first shaft member 12. With respect to its axial direction, the first shaft member 12 includes a region 12a in which the external thread portion 16 is formed and a torque adjusting portion 12b. The second shaft member 13 is cylindrical and has the internal thread portion 17 on its inner peripheral surface. The external thread portion 16 engages the internal thread portion 17, thereby forming the shaft assembly S. Usually, these thread portions 16 and 17 are designed to have a wider lead angle than conventional threads have. For example, multiple threads such as triple threads are used for them.

A torsion spring 18 is provided around the shaft assembly S. The torsion spring 18 extends in the axial direction of the shaft members 12 and 13. One end portion 18a of the torsion spring 18 is anchored to the first shaft member 12, while the other end portion 18b is anchored to the casing 11. The rear end portion of the first shaft member 12 is formed having a slit 19 that extends in the axial direction of the shaft member 12. The one end portion 18a of the torsion spring 18 is inserted in the slit 19. A bearing member 20 is fixed to the front part of the casing 11. The other end portion 18b of the torsion spring 18 is fixed by means of the bearing member 20. The bolt 15a is removed from the tapped hole 15, an operating member W such as a screwdriver is inserted into the hole 15 from the outside of the casing 11, and the distal end of the operating member W is plugged into the slit 19. If this is done, the first shaft member 12 can be rotated by means of the operating member W. If the spring 18 is twisted after the first shaft member 12 is rotated in a first direction (e.g., clockwise), the spring 18 stores elastic energy (initial torque) that urges the shaft member 12 to rotate in a second direction (e.g., counterclockwise).

The bearing member 20 is fixed to the front end portion of the casing 11 by means of a snap ring 21. The bearing member 20 is formed having a noncircular sliding hole 20a through which the second shaft member 13 is passed. The diametrical cross section of the second shaft member 13 has a noncircular shape corresponding to the sliding hole 20a. Although the second shaft member 13 can axially move with respect to the casing 11, therefore, it is prevented from rotating. A cap 22 is provided on the front end of the second shaft member 13. As shown in FIG. 2, the second shaft member 13 directly or indirectly abuts on the force transmitting member 102 through the cap 22.

If the shaft member 12 is rotated in the first direction by means of the operating member W, the torsion spring 18 is twisted. The spring 18 stores elastic energy that urges the first shaft member 12 to rotate in the second direction. On the other hand, the second shaft member 13 is prevented from rotating by the bearing member 20. If the first shaft member 12 is rotated in the first direction by means of the operating member W, therefore, the second shaft member 13 moves in a direction such that it is drawn into the casing 11.

When the first shaft member 12 rotates in the second direction by means of the elastic energy stored by the spring 18, its torque acts on the second shaft member 13. Since the rotation of the second shaft member 13 is prevented by the bearing member 20, however, the second shaft member 13 is subjected to thrust in a direction such that it projects from the casing 11. On the other hand, a load Z that is delivered from the force transmitting member 102 to the second shaft member 13 acts in a direction such that the second shaft member 13 is pushed back into the casing 11. Accordingly, torque is generated such that the first shaft member 12 is rotated in the first direction. Forces that resist this torque include frictional torque generated between the first shaft member 12 and the casing 11, the repulsive force of the torsion spring 18, etc. As the second shaft member 13 moves to a position where those resisting forces balance with the aforesaid input load, a moderate tension can be applied to the force transmitting member 102.

Figure 3:
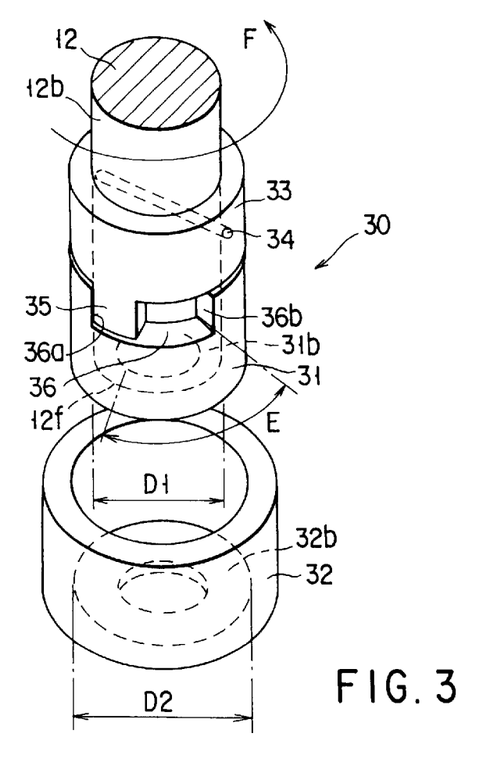
FIG. 3 is an exploded perspective view of a torque switching member of the tensioner shown in FIG. 1.

The tensioner 10 of this embodiment is provided with a torque switching member 30 between the casing 11 and the first shaft member 12. As shown in FIG. 3, the torque switching member 30 includes a first shaft receiving member 31 and a second shaft receiving member 32. In this specification, the shaft receiving member sometimes may be referred to simply as "receiving member." The torque adjusting portion 12b of the first shaft member 12 is provided with an end member 33. An end portion of the torque adjusting portion 12b is inserted in the end member 33. The shaft member 12 and the end member 33 are fixed to each other by means of a pin 34. The end member 33, which rotates integrally with the shaft member 12, constitutes a part of the first shaft member 12. The end member 33 is formed having a projection 35 that projects toward the first shaft receiving member 31. The end member 33 may be formed integrally with the first shaft member 12 on an end portion of the shaft member 12.

Figure 5A:
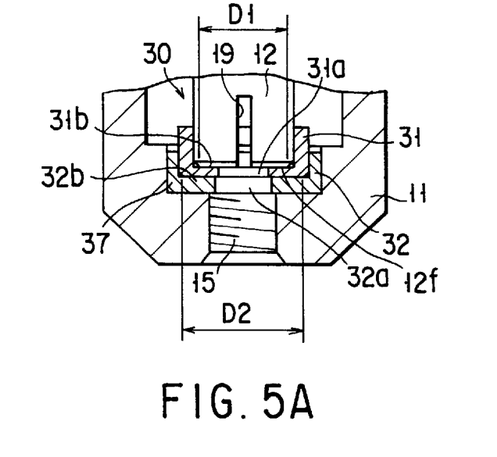
FIG. 5A is a sectional view of a part of the tensioner shown in FIG. 1.

The first receiving member 31 is in the form of a cylinder having given inside and outside diameters and includes a bottom portion 31b. As shown in FIG. 5A, the end portion of the first shaft member 12 is rotatably inserted in the first receiving member 31. An end face 12f of the first shaft member 12 rotates in contact with the bottom portion 31b of the first receiving member 31 with a contact diameter D1. The first receiving member 31 is formed having a recess 36 that receives the projection 35 of the end member 33. The recess 36 has a given length with respect to the circumferential direction of the receiving member 31. The projection 35 can move (rotate) in the circumferential direction of the receiving member 31 within the range of the circumference length of the recess 36. When the projection 35 moves in the recess 36, the first shaft member 12 and the receiving member 31 never rotate integrally with each other. In other words, the first shaft member 12 can race with respect to the first receiving member 31 within the angular range indicated by E in FIG. 3.

If the projection 35 moves within the range of E in the circumferential direction of the recess 36, the projection 35 abuts against an inner surface 36a or 36b of the recess 36 in the circumferential direction. When the projection 35 abuts against the inner surface 36a or 36b, the first shaft member 12 rotates integrally with the receiving member 31.

The second receiving member 32 is fixed to the casing 11 in a manner such that it is press-fitted into a circular hollow 37 in the casing 11. The receiving member 32 is in the form of a cylinder having given inside and outside diameters and includes a bottom portion 32b. The first receiving member 31 is rotatably inserted in the second receiving member 32. As shown in FIG. 5A, the bottom portion 31b of the first receiving member 31 and the bottom portion 32b of the second receiving member 32 touch each other substantially throughout the surface. These receiving members 31 and 32 can relatively rotate in a manner such that they are in contact with each other with a contact diameter D2.

The first shaft member 12 is supported in the hollow 37 of the casing 11 by means of the first and second receiving members 31 and 32 that mate with each other. Accordingly, the first shaft member 12 can smoothly rotate without unexpected movement. The receiving members 31 and 32 are formed having connecting holes 31a and 32a, respectively, in positions corresponding to the slit 19. In applying the aforesaid initial torque to the torsion spring 18, the distal end of the operating member W (shown in FIG. 1) can be fitted into the slit 19 through the connecting holes 31a and 32a. Depending on the material of the casing 11, the end portion of the first shaft member 12 may be inserted directly into the circular hollow 37 in the casing 11 without using the second receiving member 32. This particular feature is applicable to all the following embodiments.

The first shaft member 12 can rotate in both the first and second directions with respect to the first receiving member 31. Thus, the projection 35 moves between the inner side surface 36a or 36b of the recess 36 as long as the shaft member 12 rotates within the aforesaid range of E with respect to the first receiving member 31. In this case, only the shaft member 12 rotates with the second receiving member 32 and the first receiving member 31 kept stopped. Thus, the end face 12f of the first shaft member 12 rotates in contact with the bottom portion 31b of the first receiving member 31 with the contact diameter D1. Accordingly, a relatively small frictional torque corresponding to the contact diameter D1 is generated.

If the first shaft member 12 rotates further, the projection 35 engages the inner side surface 36a or 36b of the recess 36. Based on this engagement, the first receiving member 31 rotates integrally with the shaft member 12. Thus, the bottom portion 31b of the first receiving member 31 rotates in contact with the bottom portion 32b of the second receiving member 32 with the contact diameter D2. Accordingly, a relatively strong frictional torque corresponding to the contact diameter D2 is generated.

Figure 4:
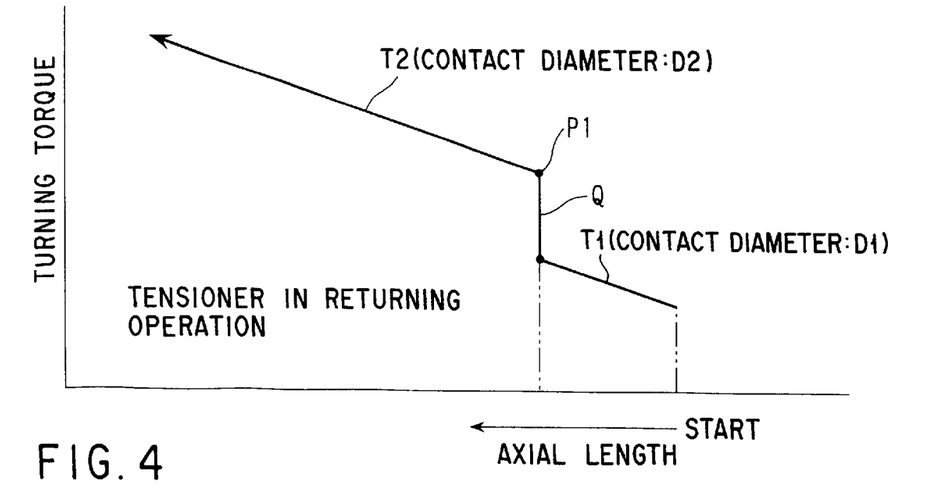
FIG. 4 is a diagram showing the relation between the axial length of the tensioner shown in FIG. 1 and torque.

FIG. 4 shows the relation between turning torque that is generated when the second shaft member 13 is subjected to the input load and the axial length of the tensioner 10 of the first embodiment. When the first shaft member 12 starts to rotate under the input load, the projection 35 moves in the recess 36 in the initial stage of the rotation. As this is done, the shaft member 12 rotates with the contact diameter D1 with respect to the first receiving member 31, so that a relatively small frictional resistance is generated. If the shaft member 12 rotates in the first direction, the repulsive force of the torsion spring 18 increases. However, the repulsive force is small as long as the torsion of the torsion spring 18 is small. Accordingly, the shaft member 12 rotates with a relatively small torque T1, thereby applying a small push force V to the force transmitting member 102.

If the input load from the force transmitting member 102 increases so that the second shaft member 13 is further pushed back into the casing 11, the projection 35 abuts against the inner side surface 36a of the recess 36. Thereupon, the first shaft member 12 and the first receiving member 31 start to rotate in a body. In this case, the friction diameter changes into D2, the frictional torque increases, and the repulsive force of the torsion spring 18 also increases. Thus, the shaft member 12 starts to rotate with a strong turning torque T2 at a point P1, as shown in FIG. 4, thereby applying a relatively strong push force V to the force transmitting member 102.

When the received load decreases, as when the received load increases, the shaft member 12 rotates with the friction diameter D1 to generate a small turning torque as long as the rotational angle of the shaft member 12 is narrow. If the rotational angle of the shaft member 12 becomes wider, the projection 35 abuts against the inner side surface 36b of the recess 36, whereupon the shaft member 12 and the receiving member 31 rotate with the friction diameter D2. Thus, a strong turning torque is generated.

According to this first embodiment, the stiffness of the tensioner against a heavy received load can be improved without failing to secure a relatively great amplitude displacement by switching the contact diameter for the rotation of the first shaft member 12 between D1 and D2 according to the rotational angle. Accordingly, this tensioner can cope with input loads ranging from light ones to heavy ones. If the load applied to the tensioner 10 from the force transmitting member 102 in an engine or the like, for example, is light, therefore, the second shaft member 13 can satisfactorily follow a small amplitude displacement, so that the tension of the force transmitting member 102 can be kept at an appropriate value.

Figure 5B:
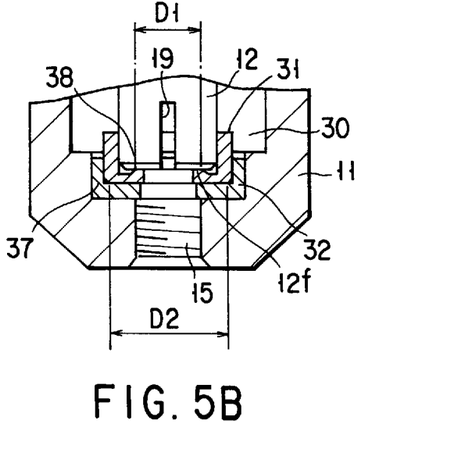
FIG. 5B is a sectional view of a part of a tensioner according to a second embodiment of the present invention.

FIG. 5B shows a second embodiment of this invention. In this embodiment, a first receiving member 31 is formed having a taper surface 38 of which the thickness increases toward its center. Thus, a contact diameter D1 for contact between a first shaft member 12 and the first receiving member 31 is made further smaller than the aforesaid contact diameter D1 according to the first embodiment.

Figure 5C:
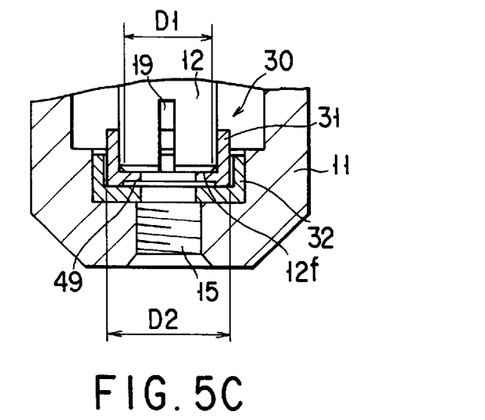
FIG. 5C is a sectional view of a part of a tensioner according to a third embodiment of the present invention.

FIG. 5C shows a third embodiment of this invention. In this embodiment, a recess 49 is formed in the central portion of the lower surface of a first receiving member 31. Thus, the first receiving member 31 touches a second receiving member 32 with a contact diameter D2 in an annular end face around the recess 49. By doing this, the contact diameter D2 can be kept fixed even if the receiving member 31 is worn to a certain degree. Although both FIGS. 5B and 5C show only those portions which are needed in explaining the contact diameters D1 and D2, other portions are constructed in the same manner as in the first embodiment.

Figure 6A:
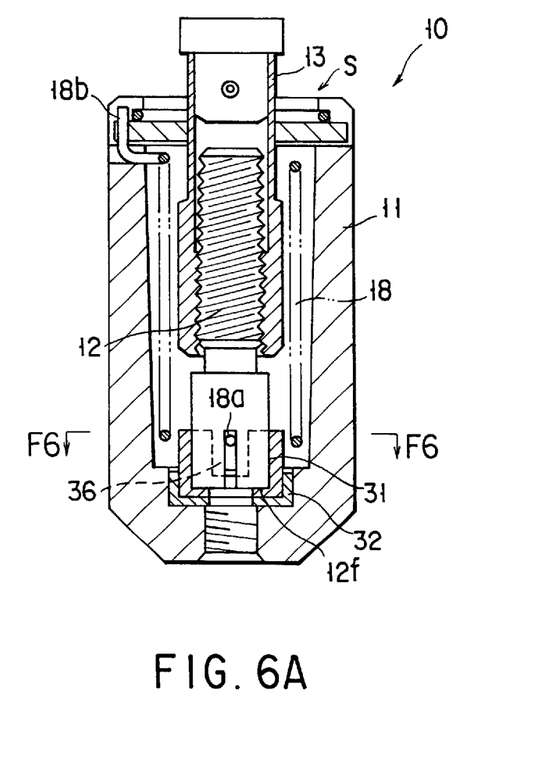
FIG. 6A is a sectional view of a tensioner according to a fourth embodiment of the present invention.
Figure 6B:
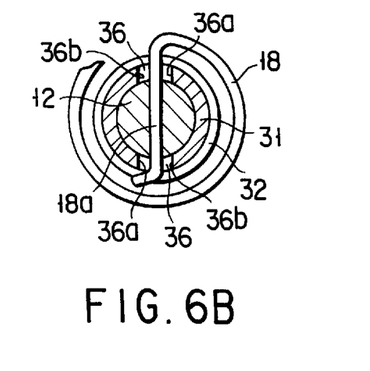
FIG. 6B is a sectional view of the tensioner taken along line F6—F6 of FIG. 6A.
Figures 7, 8A, 8B, 9:
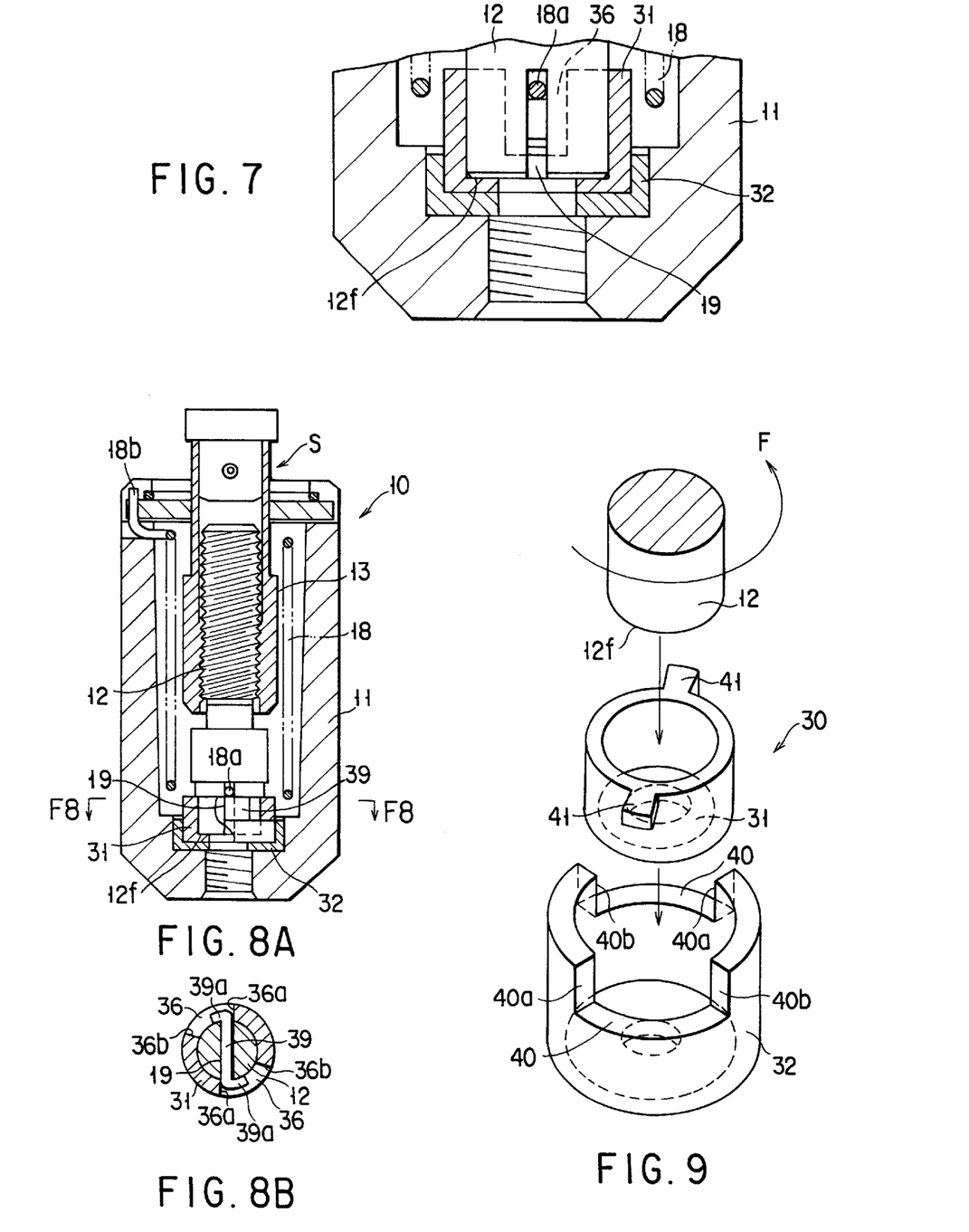
FIG. 7 is an enlarged view of a part of the tensioner shown in FIG. 6A.
FIG. 8A is a sectional view of a tensioner according to a fifth embodiment of the present invention.
FIG. 8B is a sectional view of the tensioner taken along line F8—F8 of FIG. 8A.
FIG. 9 is an exploded perspective view of a part of a tensioner according to a sixth embodiment of the present invention.

FIGS. 6A to 7 show a fourth embodiment of this invention. One end portion 18a of a torsion spring 18 of this embodiment extends in the diametrical direction of a first receiving member 31, and penetrates a recess 36 of the first receiving member 31. In this case, the one end portion 18a of the spring 18 can move in some measure in the recess 36 with respect to the circumferential direction of first receiving member 31. In this allowable range for the movement, the first receiving member 31 is stationary even though a first shaft member 12 rotates. If the rotational angle of the shaft member 12 becomes wider, the one end portion 18a of the spring 18 engages an inner side surface 36a or 36b of the recess 36, thereby causing the first receiving member 31 to rotate integrally with the shaft member 12. Since the one end portion 18a of the spring 18 of this embodiment fulfills the same function with the end member 33 of the first embodiment, the number of components of the tensioner 10 can be reduced.

FIGS. 8A and 8B show a fifth embodiment of this invention. In this embodiment, one end portion 18a of a spring 18 and an anchor piece 39 are inserted in a slit 19. The anchor piece 39 extends in the diametrical direction of a first receiving member 31, and both end portions 39a of the anchor piece 39 are situated inside a recess 36 of the first receiving member 31. The first receiving member 31 never rotates in the allowable range for the movement of the end portion 39a of the anchor piece 39 in the recess 36 when the first shaft member 12 rotates. If the rotational angle of the shaft member 12 becomes wider, the end portion 39a of the anchor piece 39 abuts against an inner side surface 36a or 36b of the recess 36, whereupon the first receiving member 31 rotates with the shaft member 12. Thus, the anchor piece 39 fulfills the same function with the end member 33 of the first embodiment. In these fourth and fifth embodiments also, the turning torque can be changed by switching the rotational contact diameter of an end face 12f of the first shaft member 12 between D1 and D2.

Figure 10A:
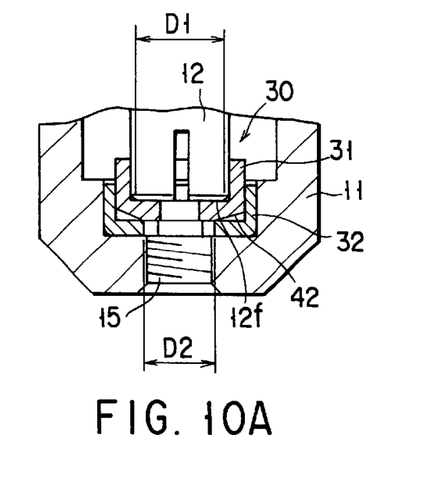
FIG. 10A is a sectional view of a part of the tensioner shown in FIG. 9.

FIGS. 9 and 10A show a sixth embodiment of this invention. In the case of this embodiment, a second receiving member 32 is formed having a pair of recesses 40. Projections 41 are formed on a first receiving member 31. The projections 41, which are situated inside the recesses 40, can move within the range of the length of the recesses 40 with respect to the circumferential direction of the second receiving member 32. As shown in FIG. 10A the bottom surface of the first receiving member 31 is formed having a taper surface 42 of which the thickness increases toward the center. By doing this, a contact diameter D2 for contact between the first receiving member 31 and the second receiving member 32 is made smaller than a contact diameter D1 for contact between the first receiving member 31 and a first shaft member 12.

In the case of this embodiment (FIGS. 9 and 10A), the first receiving member 31 rotates with the shaft member 12 in the allowable range for the movement of the projections 41 in the recesses 40 when the first shaft member 12 rotates. At this point in time, the contact diameter is D2, and a generated frictional torque is relatively small. If the rotational angle of the shaft member 12 becomes wider, the projections 41 abut against inner side surfaces 40a or 40b of the recesses 40, whereupon the rotation of the first receiving member 31 stops, so that only the shaft member 12 rotates with the large contact diameter D2. A frictional torque generated in this case is greater than one that is obtained when the shaft member 12 rotates with the contact diameter D2. Thus, also in this embodiment, the turning torque of the first shaft member 12 can be changed in two stages.

Figure 10B:
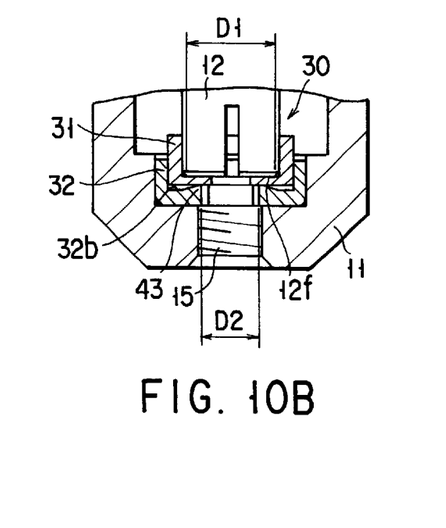
FIG. 10B is a sectional view of a part of a tensioner according to a seventh embodiment of the present invention.

FIG. 10B shows a seventh embodiment of this invention. The fundamental arrangement of this embodiment resembles that of the sixth embodiment. In the seventh embodiment, however, a portion 43 that is thicker than its surrounding region is formed in the center of a bottom portion 32b of a second receiving member 32. Thus, a contact diameter D2 for contact between a first receiving member 31 and the second receiving member 32 is made smaller than a contact diameter D1 for contact between the first receiving member 31 and a first shaft member 12. In this seventh embodiment, as in the sixth embodiment, therefore, the turning torque can be changed in two stages.

Figure 11:
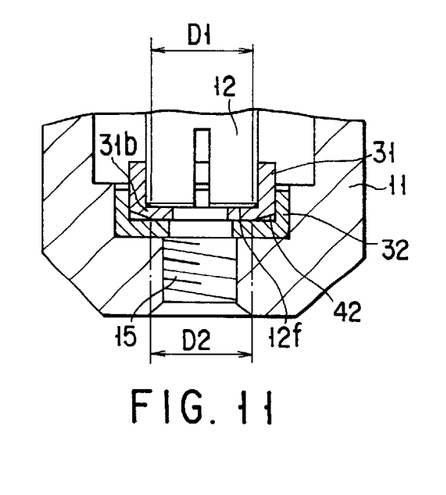
FIG. 11 is a sectional view of a part of a tensioner according to an eighth embodiment of the present invention.

FIG. 11 shows an eighth embodiment of this invention. The fundamental arrangement of this embodiment resembles that of the sixth embodiment (FIG. 10A). In the case of the eighth embodiment, however, a taper surface 42 is formed on the bottom portion of a first receiving member 31 so that a first contact diameter D1 and a second contact diameter D2 are substantially equal.

In the case where D1 and D2 are equal, as in the case of this embodiment, the properties of the surface of a contact portion between the shaft member 12 and the receiving member 31 and the properties of the surface of a contact portion between the receiving members 31 and 32 are differentiated so that the respective frictional torques of the two contact portions are different. The turning torques T1 and T2 can be differentiated by varying, for example, the type of plating for the two contact portions, surface hardness, or material of the contact portions. Thus, the value of the turning torque can be adjusted by suitably treating or modifying the surfaces of the contact portions. This technical idea is also applicable to the first to seventh embodiments described above.

Figure 12:
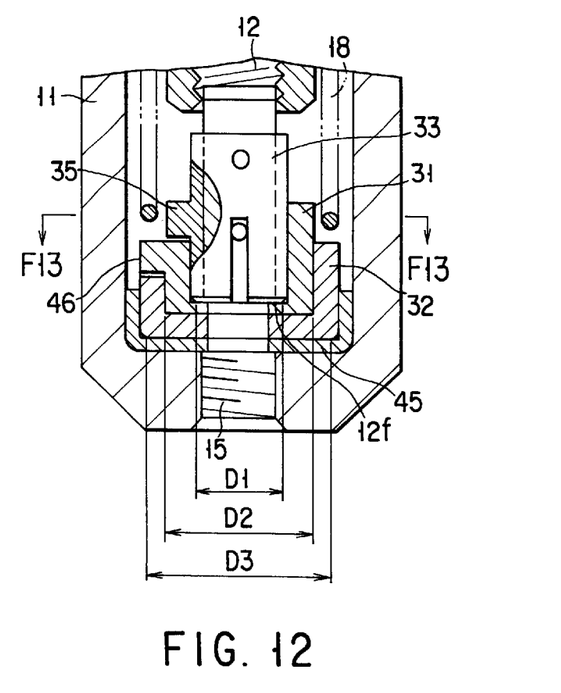
FIG. 12 is a sectional view of a part of a tensioner according to a ninth embodiment of the present invention.
Figure 13:
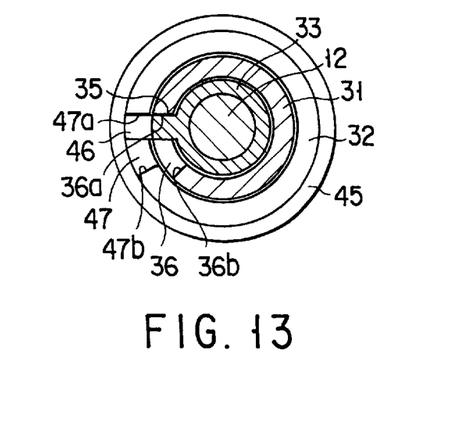
FIG. 13 is a sectional view taken along line F13—F13 of FIG. 12.

FIGS. 12 and 13 show a tensioner of a ninth embodiment of this invention. The tensioner of this embodiment comprises a first receiving member 31 in which an end member 33 is inserted for rotation, a second receiving member 32 in which the receiving member 31 is inserted for rotation, and a third receiving member 45 in which the second receiving member 32 is inserted for rotation. The third receiving member 45 is fixed to the bottom surface of a casing 11.

AS shown in FIG. 13, a projection 35 formed on the end member 33 penetrates a recess 36 formed in the first receiving member 31. The projection 35 can move between inner side surfaces 36a and 36b of the recess 36 with respect to the circumferential direction of the first receiving member 31. The first receiving member 31 is formed having a projection 46 like the projection 35 of the end member 33. The second receiving member 32 is formed having a recess 47 that is penetrated by the projection 46. The projection 46 can move between inner side surfaces 47a and 47b of the recess 47 with respect to the circumferential direction of the second receiving member 32. When a shaft member 12 rotates, the projection 35 moves in the recess 36 as long as the rotational angle is narrow, so that the first receiving member 31 and the second receiving member 32 are stopped. Since the contact diameter of the shaft member 12 is then D1, the turning torque is minimal. If the rotational angle of the shaft member 12 increases by a certain degree, the first projection 35 first abuts against the inner side surface 36a or 36b of the recess 36. Thereupon, the first receiving member 31 rotates with the shaft member 12. As long as the rotational angle of the first receiving member 31 is narrow, the second projection 46 moves in the recess 47, so that the second receiving member 32 never rotates. Since the contact diameter is then D2, the turning torque is medium. If the shaft member 12 rotates further, the projection 46 abuts against the inner side surface 47a or 47b of the recess 47. Thereupon, the second receiving member 32 also rotates with the shaft member 12. Since the contact diameter is then D3, the turning torque is maximal. Thus, in the tensioner of the ninth embodiment, the turning torque of the shaft member 12 can be changed more finely in three stages.

In this embodiment also, the type of plating for the individual members, surface hardness, or material may be varied in order to differentiate the respective frictional torques of the aforesaid three contact portions.

Figure 14:
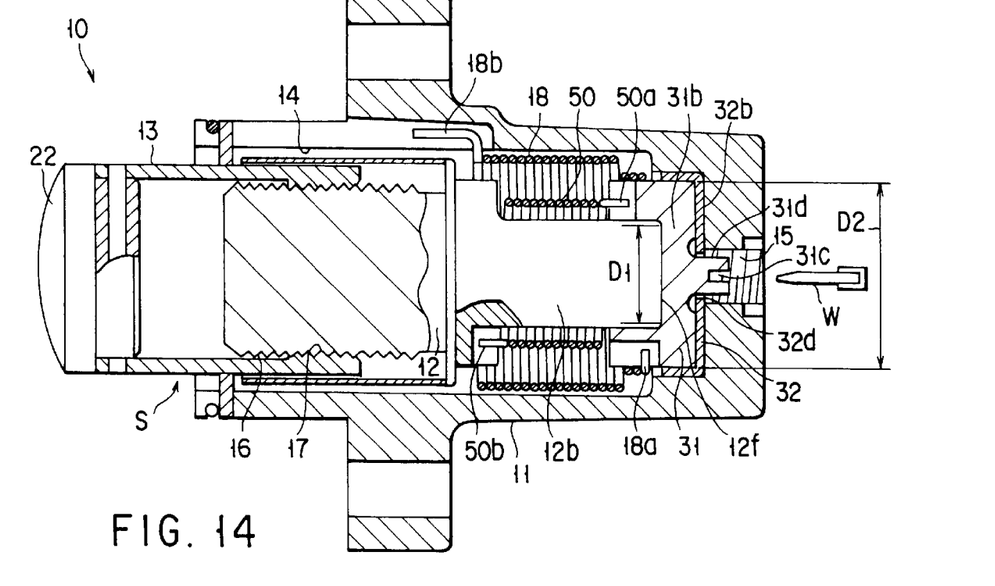
FIG. 14 is a sectional view of a tensioner according to a tenth embodiment of the present invention.

FIG. 14 shows a tenth embodiment of this invention. A tensioner 10 of this embodiment is provided with a connecting spring 50 that constitutes a clutch mechanism. Further, a torsion spring 18 is provided around a first shaft member 12. On the other hand, the torsion spring 18 of the tensioner 10 of each of the foregoing embodiments is provided covering the first shaft member 12 and a second shaft member 13. However, the torsion springs 18 of any of the embodiments have the basic function of applying torque to the first shaft member 12 in common. The repulsive force of the torsion springs 18 described in connection with these embodiments acts in the direction to push out the shaft member 13 from the casing 11. Depending on the direction of the input load, however, the repulsive force of the torsion springs 18 may be made to act in the direction to push back the shaft member 13 into the casing 11.

The tensioner 10 of this tenth embodiment is also provided with a tubular second receiving member 32 that is fixed in the casing 11. The receiving member 32 has a bottom portion 32b. A tubular first receiving member 31 having a bottom portion 31b is rotatably inserted in the receiving member 32. An end portion of the first shaft member 12 is rotatably inserted in the first receiving member 31. A hole 32d is formed in the center of the bottom portion 32b of the second receiving member 32. A protrusion 31d to be inserted into the hole 32d is formed in the center of the bottom portion 31b of the first receiving member 31. The protrusion 31d projects into a tapped hole 15 through the hole 32d. A slit 31c is formed in the distal end of the protrusion 31d.

One end portion 18a of the torsion spring 18 is anchored to the first receiving member 31. The other end portion 18b of the torsion spring 18 is anchored to the casing 11. The connecting spring 50 is provided between the inner peripheral surface of the torsion spring 18 and the outer peripheral surface of a torque adjusting portion 12b of the shaft member 12. One end 50a of the connecting spring 50 is anchored to the first receiving member 31. The other end 50b of the connecting spring 50 is anchored to the first shaft member 12. Torques that are generated as the torsion spring 18 and the connecting spring 50 are twisted have the same direction.

An operating member W such as a screwdriver is inserted into the tensioner 10 of this tenth embodiment (FIG. 14) through the hole 15, and the distal end of the operating member W is fitted into the slit 31c. Then, the respective ends 18a and 50a of the springs 18 and 50 are individually rotated for a given number of times in a first direction by turning the operating member W. The first shaft member 12 is connected to the first receiving member 31 by means of the connecting spring 50. If the receiving member 31 is rotated in the first direction, therefore, the connecting spring 50 causes the first shaft member 12 to rotate in the first direction. This rotation causes the second shaft member 13 to move in a direction such that it is drawn into the casing 11. Simultaneously with this rotation, the torsion spring 18 is twisted in a direction such that it stores a repulsive force, whereupon it is given initial torque.

If an external load to push the second shaft member 13 is applied to the tensioner 10 of the tenth embodiment that is given the first torque, the load is transmitted to the first shaft member 12 via thread portions 16 and 17, whereupon the first shaft member 12 rotates. As long as the received load is so light that the connecting spring 50 is twisted only slightly, the first receiving member 31 never rotates if the shaft member 12 rotates. In this case, an end face 12f of the shaft member 12 rotates with a contact diameter D1 with respect to the bottom portion 31b of the first receiving member 31, so that a small frictional torque is generated.

If the received load increases so that the rotational angle of the shaft member 12 widens, the first receiving member 31 is coupled to the shaft member 12 as the twist of the connecting spring 50 increases. Thereupon, the receiving member 31 and the shaft member 12 rotate. In this case, the first receiving member 31 rotates with a contact diameter D2 with respect to the second receiving member 32, so that the turning torque increases.

Figure 15:
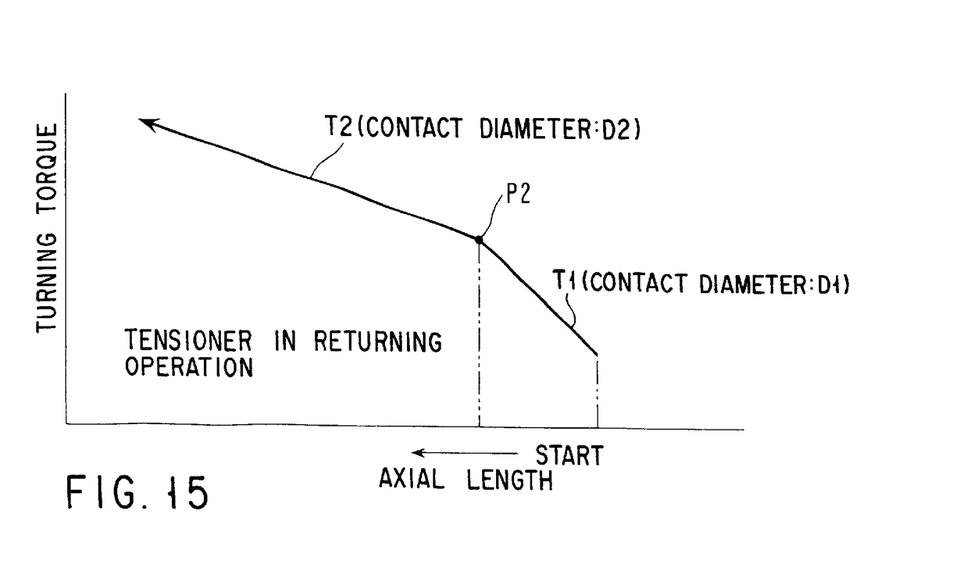
FIG. 15 is a diagram showing the relation between the axial length of the tensioner shown in FIG. 14 and torque.

FIG. 15 shows changes of the turning torque of the tensioner 10 of the tenth embodiment. When the first shaft member 12 rotates for a narrow rotational angle (or with a light received load), a turning torque T1 based on the contact diameter D1 is generated. When the second shaft member 13 further moves in the axial direction as the received load increases, the shaft member 12 and the receiving member 31 are coupled to each other at a point P2 of FIG. 15 by means of the connecting spring 50. In this case, a relatively strong turning torque T2 is generated on the basis of the contact diameter D2.

If the increased received load is reduced so that the shaft member 12 rotates in the opposite direction, the contact diameter changes according to the rotational angle, so that the turning torque can be changed.

As seen from FIG. 15, the turning torque T1 in the first stage and the turning torque T2 in the second stage are continuous with each other, and there exists no step portion Q such as the one shown in FIG. 4. Thus, according to this tenth embodiment, the change of the turning torque is mediated by the elastic action of the connecting spring 50, so that the continuity between T1 and T2 can be obtained. According to the tenth embodiment arranged in this manner, compared with the foregoing embodiments, the fluctuation of the turning torque can be smoothed.

Figure 16:
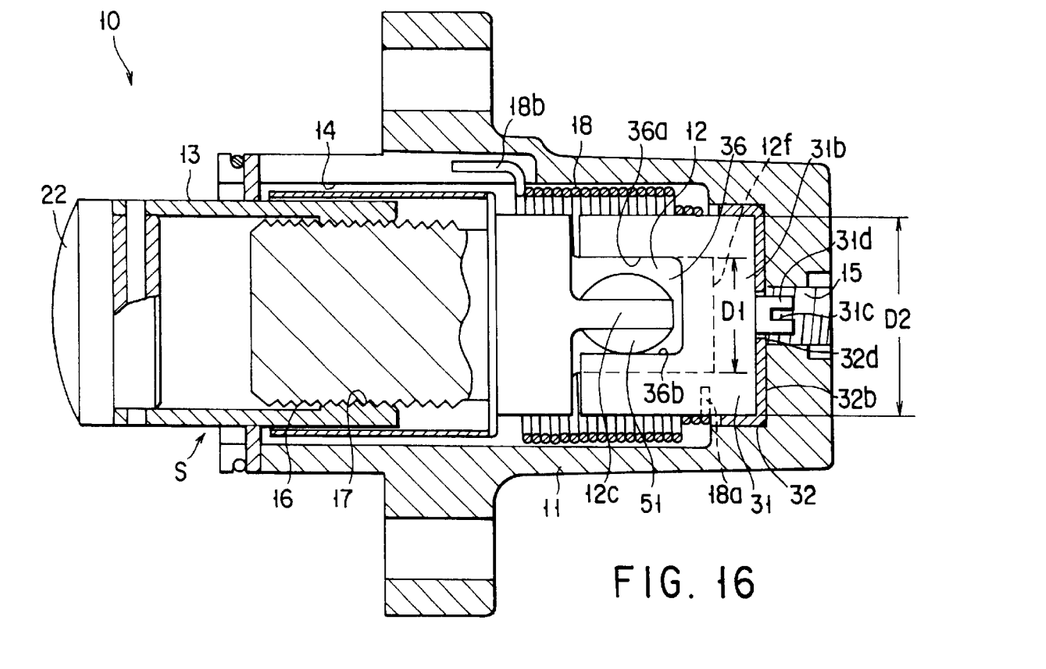
FIG. 16 is a sectional view of a tensioner according to an eleventh embodiment of the present invention.

FIG. 16 shows a tensioner 10 of an eleventh embodiment of this invention. This tensioner 10 comprises a protrusion 12c formed on a first shaft member 12 and rubber members 51 provided on the protrusion 12c. The protrusion 12c and the rubber members 51 are situated inside a recess 36 that is formed in a first receiving member 31. The protrusion 12c and the recess 36 constitute a clutch mechanism that connects the first shaft member 12 and the first receiving member 31. A cylindrical second receiving member 32 having a bottom portion 32b is fixed to a casing 11. A cylindrical first receiving member 31 having a bottom portion 31b is rotatably inserted in the receiving member 32. An end portion of the first shaft member 12 is rotatably inserted in the first receiving member 31. The protrusion 12c is formed on the peripheral surface of the first receiving member 31. The rubber members 51 that function as elastic members are attached individually to the opposite side faces of the protrusion 12c. The rubber members 51 face inner side surfaces 36a and 36b of the recess 36, individually. Further, a torsion spring 18 is provided around the first shaft member 12 and the first receiving member 31. One end portion 18a of the torsion spring 18 is anchored to the first receiving member 31. The other end portion 18b of the torsion spring 18 is anchored to the casing 11. The tensioner 10 of this eleventh embodiment, like the tenth embodiment, is provided with a protrusion 31d having a slit 31c for initial torque, a hole 32d, etc.

If the tensioner 10 of the eleventh embodiment is subjected to load in the direction to push a second shaft member 13, the load is transmitted to the first shaft member 12 via thread portions 16 and 17, whereupon the first shaft member 12 rotates. As long as the rotational angle of the shaft member 12 is narrow, the protrusion 12c moves in the recess 36, so that the first receiving member 31 never rotates. In this case, the shaft member 12 rotates with a contact diameter D1, so that the turning torque is relatively small.

If the received load increases so that the rotational angle of the shaft member 12 widens, the rubber members 51 engage the inner side surface 36a or 36b of the recess 36. This engagement causes the rubber members 51 to be compressed as the receiving member 31 and the shaft member 12 are coupled to each other. Thereupon, the receiving member 31 and the shaft member 12 rotate. Thus, the first receiving member 31 rotates with a contact diameter D2 with respect to the second receiving member 32. Accordingly, the turning torque increases.

If the increased received load is reduced, the repulsive force of the spring 18 causes the first receiving member 31 to rotate in a second direction, and the first shaft member 12 also rotates in the second direction. Thus, the second shaft member 13 moves in a direction such that it projects from the casing 11. In this case, the turning torque can be also changed between a smaller turning torque T1 for the contact diameter D1 and a greater turning torque T2 for the contact diameter D2, depending on the rotational angle of the shaft member 12.

Figure 17:
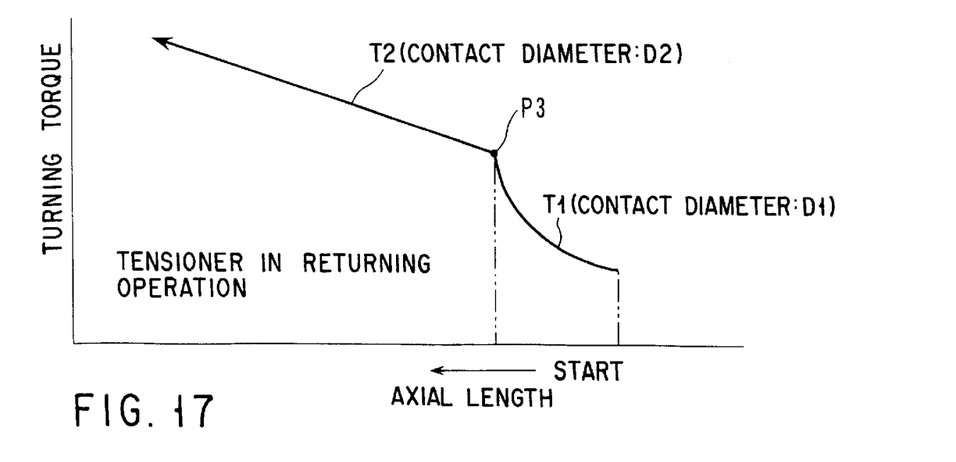
FIG. 17 is a diagram showing the relation between the axial length of the tensioner shown in FIG. 16 and torque.

FIG. 17 shows change of the turning torque of the tensioner 10 of the eleventh embodiment. As seen from FIG. 17, the turning torque T1 in the first stage and the turning torque T2 in the second stage are continuous with each other with P3 between them, and moreover, the torque T1 in the first stage is represented by a downwardly convex curved line. The characteristic of this torque T1 can be obtained as the rubber members 51 are compressed between the protrusion 12c and the inner side surface 36a or 36b.

Figure 18:
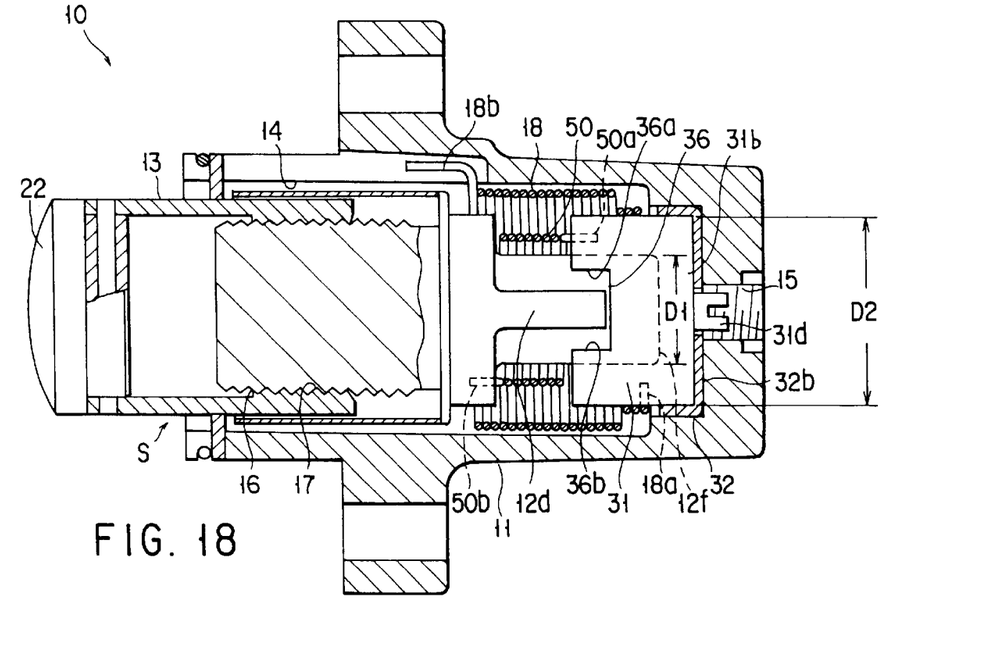
FIG. 18 is a sectional view of a tensioner according to a twelfth embodiment of the present invention.

FIG. 18 shows a tensioner 10 of a twelfth embodiment of this invention. The tensioner 10 of this embodiment has a protrusion 12d and a recess 36 to be penetrated by the protrusion 12d, besides aforementioned tenth embodiment (FIG. 14). If the rotational angle of a first shaft member 12 is narrow, the protrusion 12d can move between inner side surfaces 36a and 36b of the recess 36. The protrusion 12d and the inner side surfaces 36a and 36b of the recess 36 constitute a clutch mechanism. This clutch mechanism regulates the angular range in which the shaft member 12 and a receiving member 31 can rotate with respect to each other.

One end portion 18a of a torsion spring 18 is anchored to the first receiving member 31, while the other end portion 18b is anchored to the casing 11. One end 50a of a connecting spring 50 is anchored to the first receiving member 31, while the other end 50b is anchored to the first shaft member 12.

The protrusion 12d is formed on the peripheral surface of the first shaft member 12. The recess 36 is formed in an end portion of the first receiving member 31, covering a given length with respect to its circumferential direction. The protrusion 12d is situated in the recess 36. Thus, the angle at which the shaft member 12 and the receiving member 31 can rotate relatively to each other is regulated according to the circumferential length of the recess 36.

If a load in the direction to push a second shaft member 13 from the outside is applied to the tensioner 10 (FIG. 18) of the twelfth embodiment, the load is transmitted to the first shaft member 12 via thread portions 16 and 17, whereupon the first shaft member 12 rotates. If the received load is light, that is, if the rotational angle of the shaft member 12 is narrow, the protrusion 12d moves in the recess 36. Accordingly, the first receiving member 31 never rotates, and only the shaft member 12 rotates. In this case, an end face 12f of the shaft member 12 rotates with a contact diameter D1 with respect to a bottom portion 31b of the first receiving member 31, so that a small frictional torque is generated.

Figure 19:
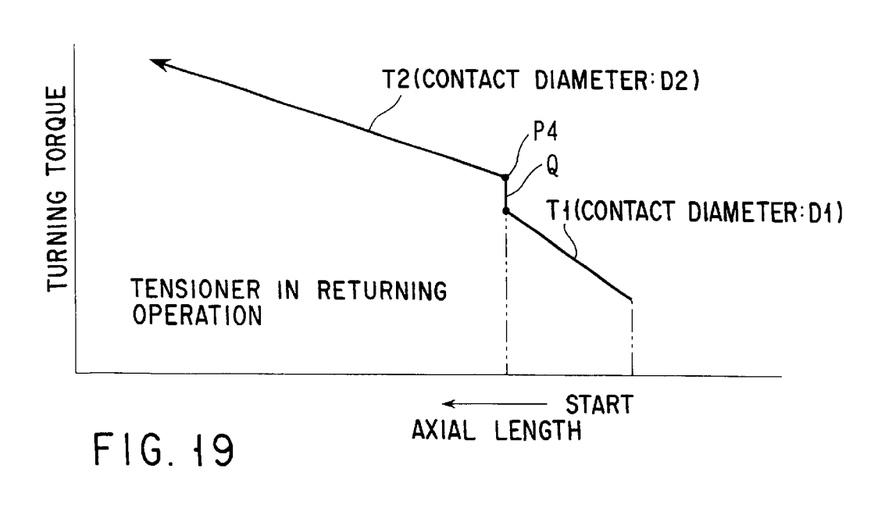
FIG. 19 is a diagram showing the relation between the axial length of the tensioner shown in FIG. 18 and torque.

If the received load increases so that the rotational angle of the shaft member 12 widens, the twist of the connecting spring 50 increases, and the protrusion 12d abuts against the inner side surface 36a of the recess 36, whereupon the receiving member 31 rotates with the shaft member 12. In this case, the first receiving member 31 rotates with a contact diameter D2 with respect to a second receiving member 32, so that a strong frictional torque is generated. FIG. 19 shows change of the turning torque of the tensioner 10 of the twelfth embodiment. The contact diameter changes from D1 to D2 at a point P4 in FIG. 19. A step portion Q between T1 and T2 can be reduced with use of the connecting spring 50.

Figure 20:
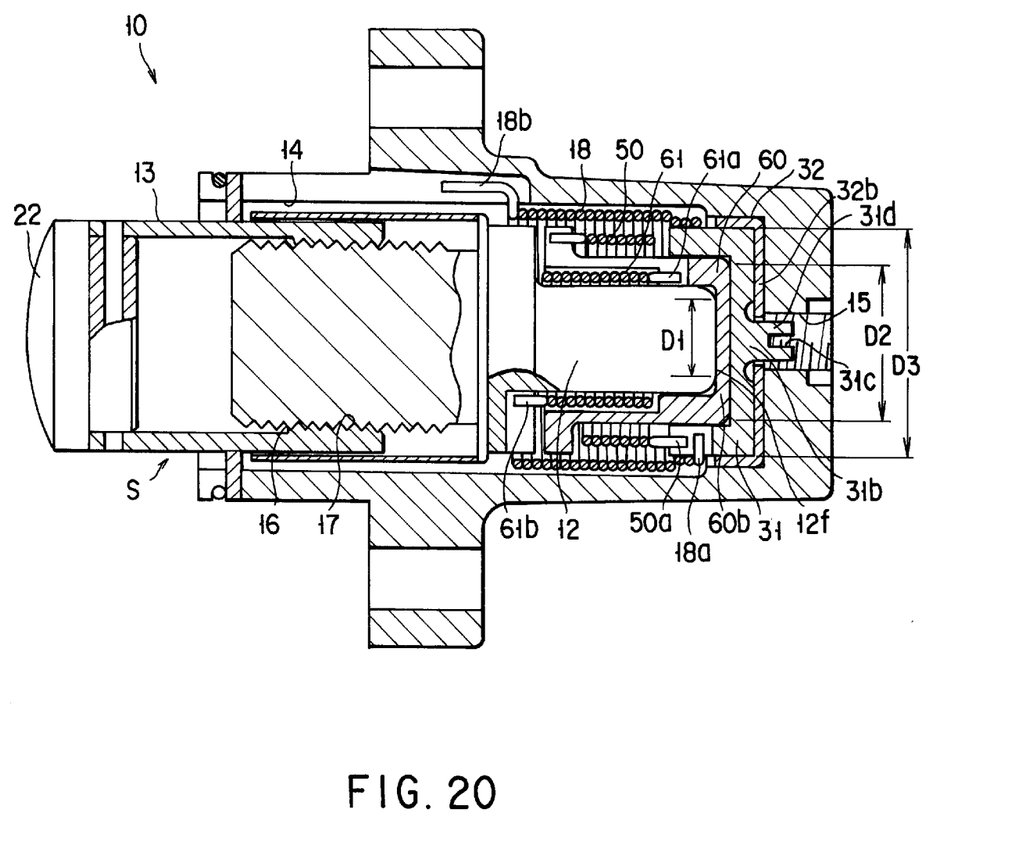
FIG. 20 is a sectional view of a tensioner according to a thirteenth embodiment of the present invention.

FIG. 20 shows a tensioner of a thirteenth embodiment of this invention. This tensioner has a third receiving member 60 and a second connecting spring 61, besides aforementioned tenth embodiment (FIG. 14). First and second receiving members 31 and 32, torsion spring 18, and first connecting spring 50 share the same constructions and functions with those of the tenth embodiment.

In this thirteenth embodiment, a first shaft member 12 is rotatably inserted in the third receiving member 60. The third receiving member 60 is rotatably inserted in the first receiving member 31. The second connecting spring 61 is provided between the inner peripheral surface of the connecting spring 50 and the outer peripheral surface of the shaft member 12. One end 61a of the second connecting spring 61 is anchored to the third receiving member 60. The other end 61b of the second connecting spring 61 is anchored to the first shaft member 12. The direction of the repulsive force that is generated as the torsion spring 18 is twisted is coincident with the direction of the repulsive force that is generated as the connecting springs 50 and 61 are twisted.

An operating member such as a screwdriver is inserted into the tensioner 10 of this thirteenth embodiment (FIG. 20) through a hole 15, and its distal end is fitted into a slit 31c. Then, the torsion spring 18 and the connecting springs 50 and 61 are individually rotated for a given number of times in a first direction by turning the operating member. When the first receiving member 31 rotates in the first direction, the twist of the connecting springs 50 and 61 increases, so that the first shaft member 12 rotates in the first direction. This rotation causes a second shaft member 13 to move in a direction such that it is drawn into the casing 11. Simultaneously with this rotation, the torsion spring 18 is twisted in a direction such that it stores a repulsive force, whereupon it is given initial torque.

If an external load to push the second shaft member 13 is applied to this tensioner 10, the load is transmitted to the first shaft member 12 via thread portions 16 and 17, whereupon the first shaft member 12 rotates. As long as the received load is so light that the rotational angle of the shaft member 12 is narrow, the twist of the connecting spring 61 is so small that the third receiving member 60 never rotates. In this case, an end face 12f of the shaft member 12 rotates with a contact diameter D1 with respect to a bottom portion 60b of the third receiving member 60, so that a relatively small frictional torque is generated.

If the received load increases so that the rotational angle of the shaft member 12 widens, the twist of the second connecting spring 61 increases, so that the connecting spring 61 causes the shaft member 12 and the third receiving member 60 to rotate with each other. In this case, the third receiving member 60 rotates with a contact diameter D2 with respect to the first receiving member 31, so that a medium frictional torque is generated.

If the received load further increases so that the shaft member 12 rotates further, the twist of the first connecting spring 50 increases, whereupon first receiving member 31 is also rotated via the connecting spring 50. In this case, the first receiving member 31 rotates with a contact diameter D3 with respect to the second receiving member 32, so that the frictional torque is maximal.

If the increased received load is reduced so that the tensioner 10 is actuated in the opposite direction, the repulsive force of the torsion spring 18 causes the first shaft member 12 to rotate in a second direction. When the received load is reduced in this manner, just as when the received load increases, the contact diameter changes in three stages in accordance with the rotational angle of the shaft member 12, so that the turning torque can be changed gradually.

In the tensioner of this thirteenth embodiment, the turning torque of the shaft member 12 can be changed more finely in three stages. In this embodiment also, the type of plating for the individual members, surface hardness, or material may be varied in order to differentiate the respective frictional torques of the aforesaid three contact portions. Although the turning torque is changed in three stages in either of the ninth and thirteenth embodiments, it may alternatively be changed in four stages or more.

As is evident from the above description, the tensioner of the present invention can be suitably used in a power transmission mechanism that uses an endless belt, endless chain, etc., such as an automotive engine, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A tensioner comprising:
   a first shaft member rotatably inserted in a casing so as to be restrained from axial movement and having a first thread portion;
   a second shaft member having a second thread portion mating with said first thread portion, axially movable with respect to said casing, and restrained from rotation;
   a torsion spring for generating torque capable of rotating said first shaft member; and
   torque switching means for changing the turning torque of said first shaft member in accordance with a rotational angle of said first shaft member.

2. A tensioner according to claim 1, wherein said torque switching means includes a torque switching member for changing a frictional torque depending on the rotational angle, narrow or wide, of said first shaft member.

3. A tensioner according to claim 2, further comprising a receiving member provided for rotation between an end face of said first shaft member and said casing and an electric member adapted to couple said first shaft member and said receiving member when the rotational angle of said first shaft member exceeds a given value.

4. A tensioner according to claim 2, further comprising a receiving member provided for rotation between an end face of said first shaft member and said casing, a projection provided on said first shaft member or said receiving member, and a recess having a surface adapted to engage said projection to couple said first shaft member and said receiving member when the rotational angle of said first shaft member exceeds a given value.

5. A tensioner according to claim 2, further comprising a first receiving member adapted to receive an end portion of said first shaft member for rotation and adapted to rotate said first shaft member while generating a small frictional force as long as the rotational angle of said first shaft member is narrow and adapted to rotate with said first shaft member when the rotational angle of said first shaft member exceeds a given value, and a second receiving member provided between said first receiving member and said casing and adapted to rotate said first receiving member while generating a frictional force greater than said frictional force when said first receiving member rotates.

6. A tensioner according to claim 5, further comprising an elastic member adapted to couple said first shaft member and said first receiving member when the rotational angle of said first shaft member exceeds a given value.

7. A tensioner according to claim 5, further comprising a third receiving member provided between said first shaft member and said first receiving member and adapted to rotate said first shaft member while generating a small frictional force as long as the rotational angle of said first shaft member is narrow and adapted to rotate with said first shaft member when the rotational angle of said first shaft member exceeds a given value.

8. A tensioner according to claim 7, further comprising a first connecting elastic member provided between said first receiving member and said third receiving member and adapted to couple said first receiving member and said third receiving member when the rotational angle of said third receiving member exceeds a given value, and a second connecting elastic member provided between said first shaft member and said third receiving member and adapted to couple said first shaft member and said third receiving member when the rotational angle of said first shaft member exceeds a given value.

9. A tensioner according to claim 1, wherein said torque switching means changes a frictional torque in at least three stages in accordance with the rotational angle of said first shaft member.

10. A tensioner comprising:
   a first shaft member rotatably inserted in a casing so as to be restrained from axial movement and having a first thread portion;
   a second shaft member having a second thread portion mating with said first thread portion, axially movable with respect to said casing, and restrained from rotation;
   a torsion spring for generating torque capable of rotating said first shaft member; and
   torque switching means having a clutch mechanism for changing the turning torque of said first shaft member in accordance with the rotational angle of said first shaft member.

11. A tensioner according to claim 10, wherein said torque switching means includes a torque switching element which changes a frictional torque depending on the rotational angle, narrow or wide, of said first shaft member.

12. A tensioner according to claim 10, wherein said torque switching means changes a frictional torque in at least three stages in accordance with the rotational angle of said first shaft member.

* * * * *